United States Patent [19]

Ray et al.

[11] Patent Number: 4,577,497

[45] Date of Patent: Mar. 25, 1986

[54] DYNAMOMETERS

[75] Inventors: Colin J. Ray, Chandler's Ford; Geoffrey Smith, Eastleigh, both of England

[73] Assignee: Vickers Public Limited Company, London, England

[21] Appl. No.: 667,028

[22] Filed: Nov. 1, 1984

[30] Foreign Application Priority Data

Nov. 11, 1983 [GB] United Kingdom ............. 8330217
Aug. 15, 1984 [GB] United Kingdom ............. 8420741

[51] Int. Cl.$^4$ .............................................. G01L 5/28
[52] U.S. Cl. ........................................ 73/126; 73/146
[58] Field of Search ............... 73/123, 125, 126, 146, 73/862.18, 862.19, 8, 9, 118

[56] References Cited

U.S. PATENT DOCUMENTS 3,633,412  1/1972  Pelta ................................. 73/126
3,722,269  3/1973  Gunnell et al. ..................... 73/126
3,847,012  11/1974 Sperberg ............................ 73/8

FOREIGN PATENT DOCUMENTS 1604320  12/1981  United Kingdom ............. 73/123

*Primary Examiner*—Charles A. Ruehl
*Attorney, Agent, or Firm*—Pollock, Vande Sande and Priddy

[57] ABSTRACT

A dynamometer comprises a drum mounted for rotation and driven by a drive motor, a test body coupled to the drum for rotation therewith in a fixed velocity relationship, a sensor apparatus for deriving the energy absorbed or dissipated by the test body, a sensor for determining the rotational velocity of the drum or body, and a control apparatus responsive to the energy absorbed or dissipated and to the rotational velocity and operative to supply a control signal to the drive motor to maintain the energy absorbed or dissipated as a predetermined function of drum speed.

13 Claims, 5 Drawing Figures

DYNAMOMETERS

FIELD OF THE INVENTION

The present invention relates to a dynamometer that is of particular advantage in the testing of tires and brakes of aircraft though it may also be used to test other vehicle tires and brakes and in general for monitoring the acceleration, deceleration or energy tolerance of any moving device coupled thereto such as a clutch or a motor.

BACKGROUND TO THE INVENTION

The use of a so-called "chassis dynamometer" with inertial weights to measure the acceleration and deceleration performance of an automobile or other vehicle has long been known. An article by Knudsen R. F., "Inertia Electronically", ISA Journal, April 1958, Vol. 5, No. 4, pp.52–54 describes the use of electrical torque to simulate drum inertia and thereby avoid the need to add or remove large bulky weights from the dynamometer shaft whenever it was desired to alter the inertia of the rolls or drums of the dynamometer. Knudsen derived the inertia by differentiating the speed signal from a drum tachometer, amplifying it and feeding it back as an additional torque control signal to a dynamometer torque control circuit. Gunnel and Shaw have described in patent specification No. GB-A-1297813 a drum dynamometer testing machine for the tyres and brakes of land vehicles and aircraft in which the test tyre and wheel was braked and a brake effort signal was processed and fed as a control signal to determine the torque of a Ward-Leonard dynamoelectric machine that drove the drum. Friction and windage losses were compensated for by feeding a derived speed signal through a function generator as another control signal to be combined with the brake-effort related control signal and fed to the dynamo-electric machine. The result was again to give an apparent or effective inertia to the drum that was its true mechanical inertia multiplied by an adjustment factor. A practical machine of this kind was described by J. B. Roberts entitled "An Advanced High-Speed Dynamometer for Testing Aircraft Tyres, Wheels and Brakes" and read before the Applied Mechanics Group of the Institution of Mechanical engineers on the Apr. 10, 1974. A modified machine described by Thomas in Patent specification No. GB-A-1604320 monitored the change in kinetic energy of the drum and associated mechanical parts as the drum decelerated and derived a control signal for the drum drive motor to vary the apparent or effective inertia of the drum. But these machines of the "inertia simulation" kind merely used an electrical control system to simulate the removable weights of a conventional chassis dynamometer of the 1950's and embodied the assumption that it was satisfactory to monitor energy dissipation purely passively in terms of the inertia of the rotating parts and the change in rotational velocity. It has, however, been found that inertia simulation gives only limited accuracy and repeatability, particularly where the quantity of energy to be absorbed or dissipated is only a small proportion of the initial rotational energy of the moving parts, and it is an object of the present invention to provide a dynamometer that can be made of improved accuracy.

SUMMARY OF THE INVENTION

The invention relates to a dynamometer having a drive for a rotating shaft and a test article coupled thereto and a speed controller for the drive operable to maintain a required shaft speed, and is based on the realization that as the test progresses the energy so far absorbed or dissipated by the test article may be determined, compared with the total energy to be absorbed or dissipated by the test subject and used to generate from the initial rotational speed a speed demand signal according to a required speed change scheme, the said speed demand signal being fed to the speed controller. In other words the parameters of the test are the required velocity change and the required energy change of the test subject. No particular relationship between speed and energy absorption or dissipation is essential provided that energy absorbed or dissipated increments or decrements smoothly and continuously with rotational velocity and a defined total energy absorbed or dissipated corresponds to only a single rotational velocity. The most common test condition is that the square of the angular velocity varies as the energy dissipation but other conditions are possible, and, for example, a profile can be followed that represents the change in apparent mass of an aeroplane in its landing phase.

Broadly stated, therefore, the invention provides a dynamometer comprising a member mounted for rotation and driven by driving means, a speed controller to maintain the speed of the member to the required speed in the presence of tractive load variations by controlling the driving means, a test subject mounted for rotation with the member and at the same speed, the test subject including brake means for exerting a braking torque on the member, velocity sensor means for sensing the rotational velocity of the member, power sensor means for sensing power supplied by the driving means and/or dissipated as brake load, and control apparatus having inputs for an initial rotational velocity and for an amount of energy to be dissipated and operable (a) after the brake has been applied to determine from the sensed rotational velocity and the power supplied or dissipated the energy that has been dissipated since the brake was applied, (b) to derive a proper rotational speed from the initial rotational velocity of the member, the energy already dissipated and the total energy to be dissipated and (c) to output the proper speed for the member to the speed controller.

The invention further provides a dynamometer comprising a drum mounted for rotation and driven by drive means, a test body coupled to the drum for rotation therewith in a fixed velocity relationship, means for supplying or removing energy to or form the test body to increase or decrease the rotational speed thereof, means for deriving the rotational velocity of the drum or the test body, and control means responsive to the energy absorbed or dissipated and to determined rotational velocity and operative to supply a control signal to the drive means to maintain the energy absorbed or dissipated while said energy supply or removal means is operative as a predetermined function of rotational velocity.

BRIEF DESCRIPTION OF PREFERRED FEATURES

According to a preferred feature the control means first receives a signal to drive the drum to an intended rotational velocity for the start of the test, means is operated to initiate the supply or removal of energy to or from the test body, the rotational velocity when the energy supply or removal is initiated is measured, and the control means responds to the measured initial rotational velocity and to the amount of energy supplied or dissipated to calculate the proper rotational velocity progressively as the test proceeds and to feed a velocity demand signal to the drive means.

It is a particular feature of the invention that the drum drive with its associated power control and speed control are separated from the energy control function which operates as an additional control loop external to the drum drive control loops. In practice this additional control loop has been found to give rise to much more stable and reproducible results.

BRIEF DESCRIPTION OF DRAWINGS

The invention will now be further described by way of example only with reference to the accompanying drawings in which corresponding parts are designated by the same reference numeral.

DETAILED DESCRIPTION OF PREFERRED EMBODIMENTS

Figure 1:
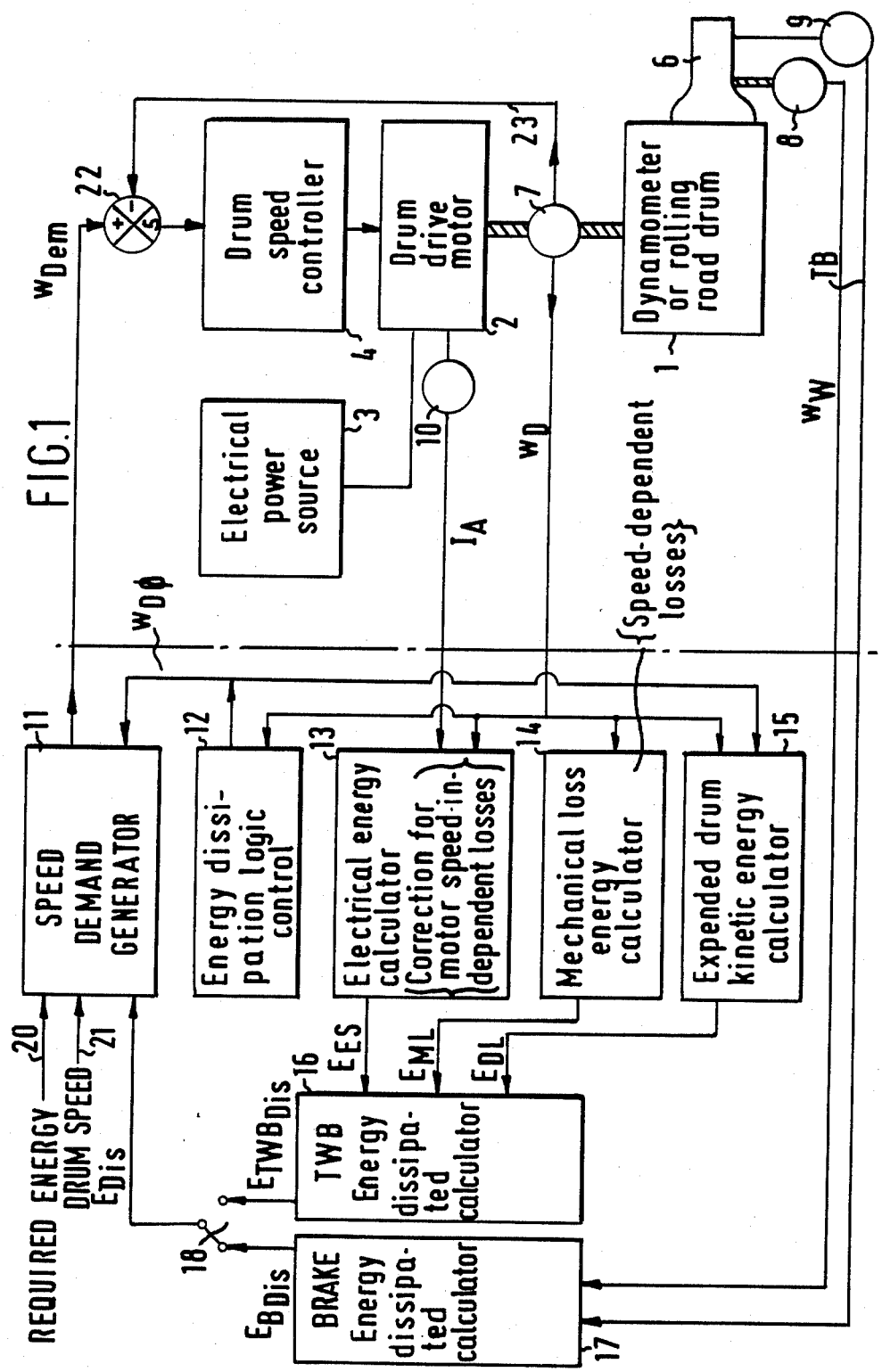
FIG. 1 is a block diagram of a dynamometer and control system according to a first embodiment of the invention.

In FIG. 1 the speed of rotation of a dynamometer or rolling road drum 1 of a tyre and brake testing machine is set by means of a speed demand generator 11 that receives at 20 and 21 instructions defining the initial conditions of the test in terms of the required initial speed of the drum 1 and of the energy that is to be dissipated during the test. The generator 11 outputs a speed demand signal $w_{Dem}$ to a comparator 22 that is fed at 23 with a drum speed signal measured by means of speed sensor 7, and the summing junction or comparator 22 in turn outputs a speed error signal to a drum speed controller 4 that maintains the speed error signal to an acceptably low value. The drum drive motor 2 which electrically varies the speed of drum 1 is driven by means of a power source or motor drive system 3 that may be a Ward Leonard synchronous motor/DC generator set or may be a thyristor or similar electronic motor control that drives the motor 2 direct from the incoming mains. A tire, wheel and brake assembly 6 holds the tyre against the drum 1 during the test at a predefined load to represent the proportion of the vehicle weight that forces the tyre against the surface of the drum 1. The said loading system usually has a closed loop controller that maintains the load under braking conditions against variations in reaction between the tyre and the drum 1.

The aforesaid drive system is used in combination with an energy control system that can monitor either the dissipation of energy in the brake or in the assembly of the tyre, wheel and brake 6. For monitoring the brake energy a wheel speed sensor 8 and a brake torque sensor 9 determine the torque applied by the brake on the wheel and tire combination. They feed a wheel speed signal $w_W$ and a brake torque signal $T_B$ to a calculator 17 that calculates the energy dissipated in the brake from time to time and feeds a signal $E_{Dis}$ denoting the amount of energy dissipation via selector 18 to the speed demand generator 11. In the alternative position of the selector 18 the energy dissipation of the tire, wheel and brake combination is monitored. The drum speed sensor 7 provides a signal $w_D$ and a current sensor 10 determines the gross motive force exerted by the motor 2 on the drum 1. In FIG. 1 this is represented by sensing the motor current which is then corrected to determine the effective electrical torque applied to the drum. But as an alternative the effective electrical torque applied to the drum may be measured directly by means of a torque transducer.

During a test the speed demand generator 11 responds to an indication from the calculator 17 of the energy so far dissipated and evaluates a drum speed setting appropriate for dissipation of the required energy according to a preset dissipation function and the final speed and energy conditions. An energy dissipation logic control unit 12 serves to control the test envelope to ensure good repeatability and closely defined test boundaries. In particular it controls the performance of inter alia the following functions:

(a) entry of a required initial rotational speed $w_{R0}$ and energy to be dissipated;

(b) running the drum up to the speed $w_{R0}$;

(c) engagement of the (initially disengaged) tire, wheel and brake assembly 6 under load conditions required for the test and reestablishment of a steady speed;

(d) application of the brake in the assembly 6 and determination simultaneously of the initial drum speed $w_{D0}$ and initial drum energy $E_{D0}$;

(e) monitoring the energy flow in the system;

(f) when the required drum speed $w_{Dem}$ at the end of the test is zero, monitoring the actual drum speed $w_D$. (A small final drum speed used to define test stop may be acceptable because the energy error contribution may be negligible).

An electrical energy calculator 13 determines the amount of energy supplied to or removed from the drum 1 by motor 2. Motor current from sensor 10 is processed by the calculator 13 which takes account of speed-independent losses and supplies an electrical energy supplied signal $E_{ES}$ to a tire, wheel and brake energy dissipated calculator 16. Drum speed sensed by sensor 7 is fed to a mechanical loss energy calculator 14 which determines the energy lost in speed dependant losses such as bearing friction and windage and supplies a mechanical energy loss signal $E_{ML}$ to the calculator 16. Also responsive to drum speed is a calculator 15 for drum kinetic energy expended that feeds a signal $E_{DL}$ to the calculator 16. The calculator 16 processes the signals $E_{ES}$, $E_{ML}$ and $E_{DL}$ to derive the energy dissipated by the tire, wheel and brake—i.e. it determines the energy that is unaccounted for by mechanical losses, electrical energy supplied or removed, and current drum kinetic energy and that must therefore have flowed across the surface of the drum 1 and into the tire, wheel and brake assembly 6.

Figure 2:
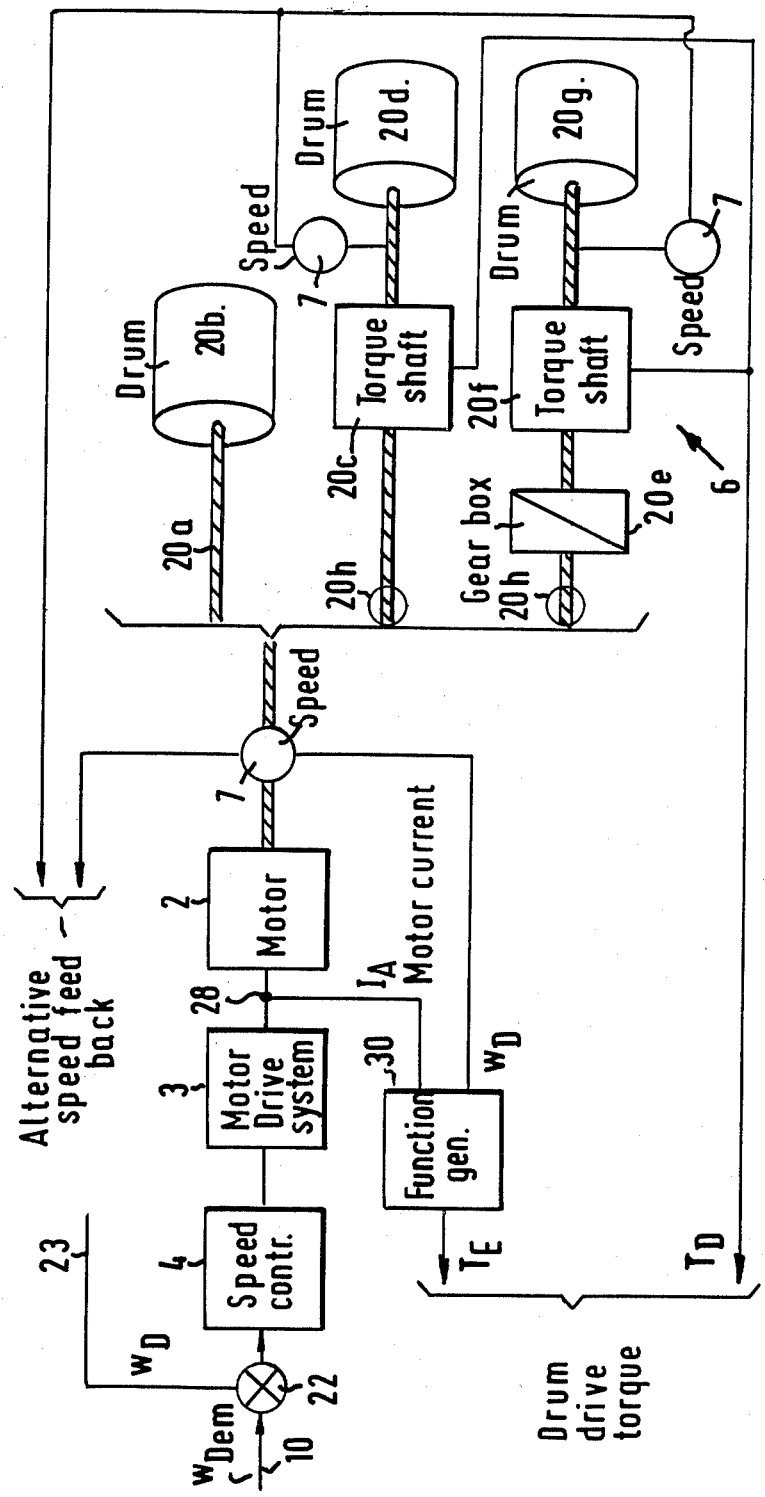
FIG. 2 is a block diagram of the dynamometer illustrated in more detail.

FIG. 2 shows the principal mechanical parts and transducers of a dynamometer according to the invention. Motor current $I_A$ sensed at 28 and shaft speed $w_D$ sensed at 7 are forwarded to function generator 30 which outputs the effective motor torque $T_e$. The motor 2 may be connected through a rigid shaft 20a to the drum 20b. Alternatively the connection may be through a torque shaft 20c to the drum 20d with an accelerometer 20h, the directly measured shaft torque $T_D$ being used instead of motor current to monitor energy. A third alternative is to interpose a gear box 20e between the motor 2 and a drum 20g in which case the use of a torque shaft 20f is mandatory.

The testing of tyres and brakes inherently involves the regulation of energy dissipation so that the dynamometer drum 1 is decelerated from its given initial speed $w_{D\emptyset}$ by the assembly under test with accurate dissipation of the requisite quantity of energy $E_{R\emptyset}$. The energy available at the start of the test is dissipated by the brake or by the tire, wheel and brake combination which acts as an energy sink. Thus at any time t after a deceleration test has begun.

$$E_{Rem} = E_{R\emptyset} - E_{Dis} \tag{1}$$

where $E_{Rem}$ represents the energy remaining to be dissipated, $E_{R\emptyset}$ is as defined above and $E_{Dis}$ represents the amount of energy that has been dissipated. Normalizing with respect to the source energy $E_{R\emptyset}$ gives fractional values $E_F$:

$$E_{F\,Rem} = 1 - E_{F\,Dis} \tag{2}$$

The kinetic energy of the system is that of its rotating mechanical parts and is proportional to the square of the angular velocity w and may be expressed in terms of the current drum speed $w_D$ and the initial drum speed $w_{D\emptyset}$ as follows.

$$E_{F\,Rem} = w_D^2 / w_{D\emptyset}^2 \tag{3}$$

Combining equations 1, 2 and 3 we obtain:

$$w_D = w_{D\emptyset} \sqrt{(1 - E_{Dis}/E_{R\emptyset})} \tag{4}$$

Equation (4) governs the flow of energy from the source (drum and other rotating parts) to the sink/brake or tire, wheel and brake, and the drum speed $w_D$ can be used as a control variable, the fraction of the original energy that has been dissipated being monitored and a consistent and representative velocity being demanded from the mechanical system. It will be noted that the angular velocity $w_D$ can be used as the control variable without reference to the actual or simulated inertia of the system and that the energy/speed function is time independent. Equation 4 defines a parabolic energy/speed function but it is not essential that such a parabolic function be strictly adhered to provided that the required energy $E_{R\emptyset}$ is dissipated into the sink and the drum speed $w_D$ and residual energy fraction $E_{F\,Rem}$ are always reducing. Thus, for example, a profile could be followed that took account of the change of the apparent mass of an aeroplane with distance travelled during the landing phase.

In brake energy regulation, the energy dissipated in the brake is equivalent to the "potential energy" of the brake. The brake torque will vary with time and may be represented by a function $T_B(t)$ and the distance through which the torque acts is also a function of time depending on the wheel velocity and may be represented by a function $w_W(t) \cdot \delta t$. Accordingly the brake energy dissipation is given by the equation.

$$E_B(t) = \int_{t_s}^{t} T_B(t) \cdot w_W(t) \cdot dt \tag{5}$$

where $t_s$ is the time at the start of the test. Both the brake torque and wheel speed are measured directly (8, 9) and the calculator 17 can calculate the energy $E_{Dis}$ according to equation (5) which is then normalized and fed to the speed demand generator 11. The discrete form of equation (5) for the energy dissipation $E_{B\,Dis}$ after n sample periods of duration $\Delta t$ is $$E_{BDis} = \sum_{i=0}^{n} \overline{T}_{Bi} \cdot \overline{w}_{Wi} \cdot \Delta t \tag{6}$$

where the values of $\overline{T}_B$ and $\overline{w}_W$ are averages. The energy dissipated in the tyre, wheel and brake combination is equivalent to the brake energy $E_B$ plus an allowance for energy dissipated in the tire and energy dissipated from the wheel. The tire cannot be instrumented to provide an accurate direct measure of the energy that it dissipates, but the tire, wheel and brake energy can be derived by determining the energy lost from the drum system 1 with calibration for and allowance of the various energy losses. Taking an energy balance of the drum drive system provides the energy passed to the tire, wheel and brake combination which is given by the fall in kinetic energy of the drum and the electrical energy supplied to the drum less the mechanical energy lost i.e.

$$E_{TWB} = (E_{D\emptyset} - E_D) + E_{ES} - E_{ML} \tag{7}$$

where the terms have the meanings above specified. Expanding these terms gives $$E_{TWB(Dis)}(t) = J_d(w_{D\emptyset}^2 - w_D^2)/2 + \int_{t_s}^{t} T_E(t) \cdot w_D(t) \cdot dt - \int_{t_s}^{t} T_L(t) \cdot w_D(t) \cdot dt \tag{8}$$

wherein $J_D$ is the rotating mass inertia, $T_E$ is the electrical torque, $T_L$ is the torque due to mechanical losses, and the other parameters have the meanings above specified. All the above parameters can be measured either directly or indirectly and the energy dissipation $E_{TWBDIS}$ calculated. Again $E_{TWBDIS}$ can be normalized and fed through selector 18 to the speed demand generator 11. Again, in practice the equation (8) is used in discrete form with a number n of sampling periods $\Delta t$ long so that $$E_{TWB(DIS)n} = J_D(w_{D(\emptyset)}^2 - w_{D(n)}^2)/2 + \sum_{i=0}^{n} \overline{T}_{E(i)} \cdot \overline{w}_{D(i)} \cdot \Delta t - \sum_{i=0}^{n} \overline{T}_{L(i)} \cdot \overline{w}_{D(i)} \cdot \Delta t \tag{9}$$

wherein $\overline{T}_{Ei}, \overline{T}_{Li}$ and $\overline{w}_{Di}$ are average values of the electrical and loss torques and the drum speed and $w_{D(n)}$ and $w_{D(o)}$ are instantaneous values.

Figure 3:
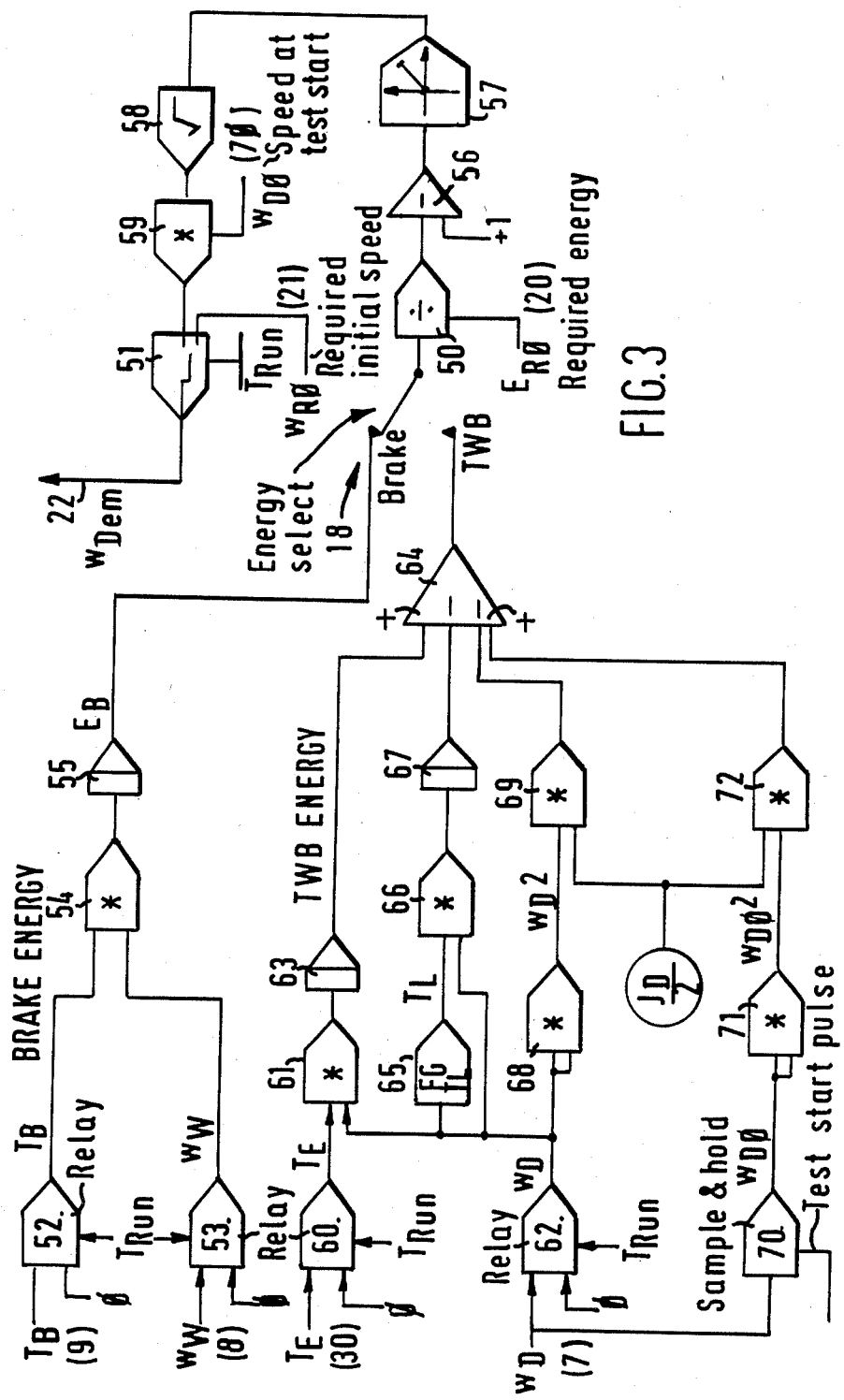
FIG. 3 is a diagram schematically illustrating a suitable control system.

A representation of a practical control circuit that performs the calculations set out above is illustrated in FIG. 3. It can calculate both brake energy dissipated and tire, wheel and brake energy dissipated and also performs the function of speed demand generation. At the start of the test the energy $E_{R\emptyset}$ required to be dissipated is fed to divider 50 and the initial drum speed $w_{D\emptyset}$ is fed via relay 51 to the comparator 22, the coil of the relay being energized only when a test running parameter $T_{Run}$ is not true. The selector 18 is set so that brake energy is monitored and sensors 8 and 9 feed the mechanical brake torque $T_B$ and the wheel speed $w_W$ to relays 52, 53 whose states depend upon the value of the parameter $T_{Run}$ and which connect to a null input when $T_{Run}$ is false. At the start of the test the parameters $E_R$ and $w_{D\emptyset}$ are obtained and the drum is run upto speed $w_D$ after which the tire is engaged with the drum under landing load conditions and the drum is allowed to reattain a steady speed. Then an "apply brakes" signal is sent to the tire, wheel and brake assembly 6 and the initial drum speed $w_{D\emptyset}$ is measured and the initial drum energy $E_{D\emptyset}$ is calculated. The parameter $T_{Run}$ is now true and the state of relay 51 changes, thereby initiating energy monitoring and control. The state of relays 52, 53 also changes when $T_{Run}$ is true thereby initiating energy monitoring and control. The parameters $T_B$ and $w_W$ are fed to multiplier 54 and integrator 55 so that for the run period $(t-t_s)$ while $T_{Run}$ is true the brake energy $E_B$ fed to divider 50 is given by:

$$\int_0^t T_B \cdot w_W \cdot dt$$

Note that when $T_{Run}$ is false the brake energy fed to divider 50 is 0. The divider 50 and subtractor 56 generate the function $1-E_{FDis}$ which by reason of the limiter 51 obeys the relationship:

$$0 < 1 - E_{F Dis} < 1.0 \quad (9)$$

The output is then fed to square root calculator 58 and to multiplier 59 fed with the measured drum velocity at the start time to derive:

$$w_{Dem} = w_{R\emptyset}; T_{Run} = \text{False} \quad (10)$$

$$w_{Dem} = w_{D\emptyset}\sqrt{(1-E_{Dis}/E_{R\emptyset})} T_{Run} = \text{True} \quad (11)$$

When measuring the tire, wheel and brake energy the electrical energy $T_E$ is input through relay 60 to multiplier 61 where it is multiplied by the drum speed $w_D$ input through relay 62 and the product passes to integrator 63 and adder 64. Relays 60, 62 are controlled according to the state of $T_{Run}$ such that $$E_{ES} = \emptyset; T_{Run} = \text{False} \quad (12)$$

$$E_{ES} = \int_\emptyset^t T_E \cdot w_D \cdot dt; T_{Run} = \text{True} \quad (13)$$

The drum velocity $w_D$ is fed to device 65 that outputs the appropriate mechanical loss torque $T_L$ which is multiplied by the drum velocity at multiplier 66 and fed to integrator 67, thereby giving $$E_{ML} = \emptyset; T_{RUN} = \text{False} \quad (14)$$

$$E_{ML} = \int_\emptyset^t T_L(w_D) \cdot w_D \cdot dt; T_{Run} = \text{True} \quad (15)$$

The measured $E_{ML}$ is also fed to adder 64. The current drum velocity $w_D$ is further fed to squares calculator 68 and thence to multiplier 69 where it is multiplied by the half inertia $J_D/2$ to give a drum kinetic energy signal to adder 64 that obeys $$E_D = \emptyset; T_{Run} = \text{False} \quad (16)$$

$$E_D = \tfrac{1}{2}J_D w_D^2; T_{Run} = \text{True} \quad (17)$$

The angular velocity $w_D$ is also fed to latch 70 controlled by a test start pulse and thence to squares calculator 71 and multiplier 72 to derive $E_{D\emptyset}$ which is fed to adder 64 and obeys the relationships.

$$E_D = \emptyset; T_{Run} = \text{False} \quad (18)$$

$$E_{D\emptyset} = \tfrac{1}{2}J_D w_D^2\emptyset; T_{Run} = \text{True} \quad (19)$$

The adder 64 calculates the tyre, wheel and brake energy according to equation 7 and outputs it to the divider 50 when the selector 18 is in the appropriate position.

Figure 4:
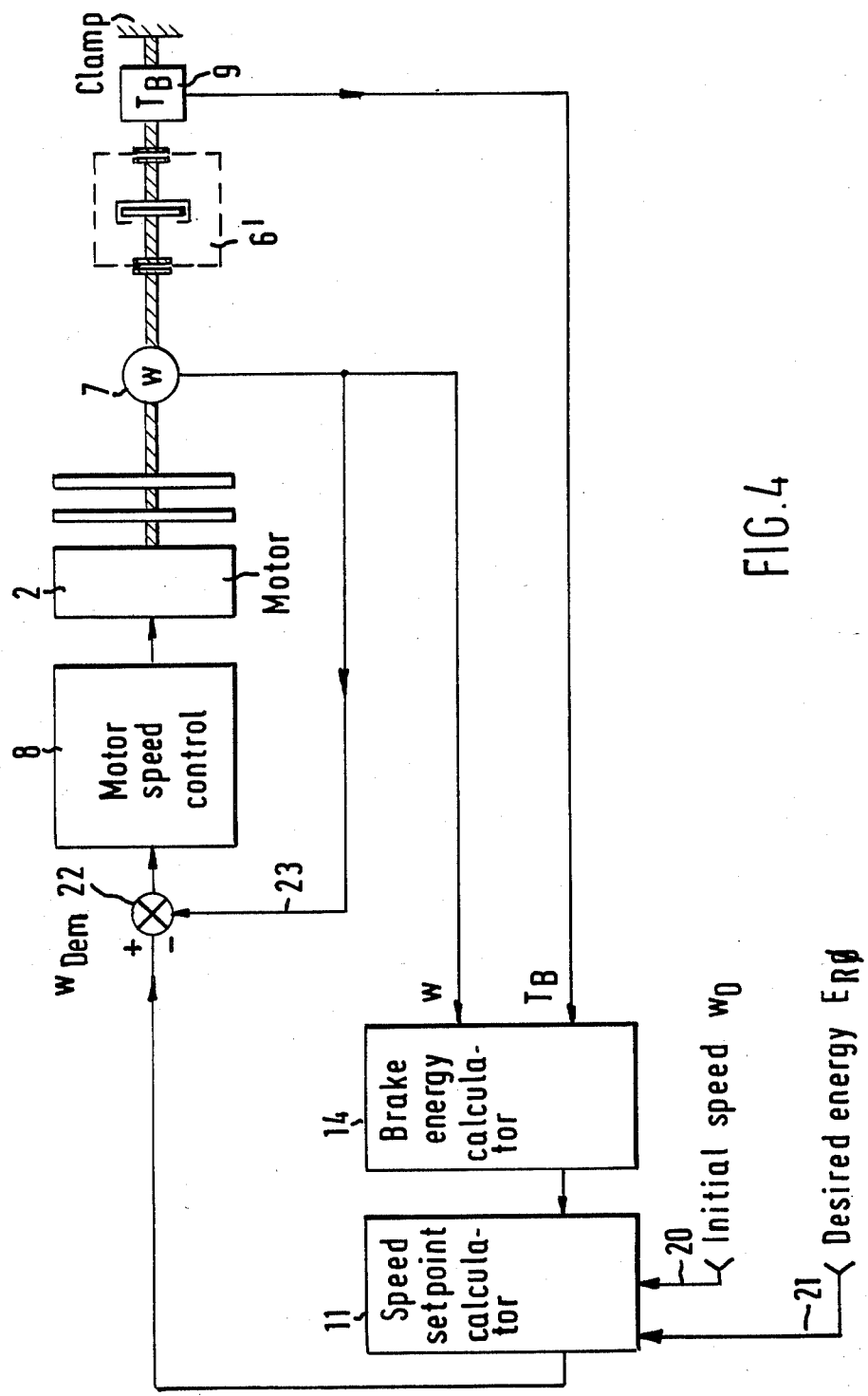
FIG. 4 is a block diagram of a dynamometer and control system for brake testing.

FIG. 4 is a block diagram of a Brake Test Machine. The objective of the machine is the same as brake testing in FIG. 1 which enables a predetermined quantity of energy to be dissipated in the brake unit 6'. The principal difference of this application is the absence of a drum and tyre since the shaft of brake 6' is directly connected to the motor drive shaft and brake speed is equated to motor speed rather than wheel speed. The energy control equations are identical viz.

$$E_B = \int_o^t TB \cdot w \cdot dt \text{ and } w_{dem} = w_0\sqrt{1 - E_B/E_{R\emptyset}}$$

There is no requirement to handle the equivalent of Tire, Wheel and Brake Energy.

Figure 5:
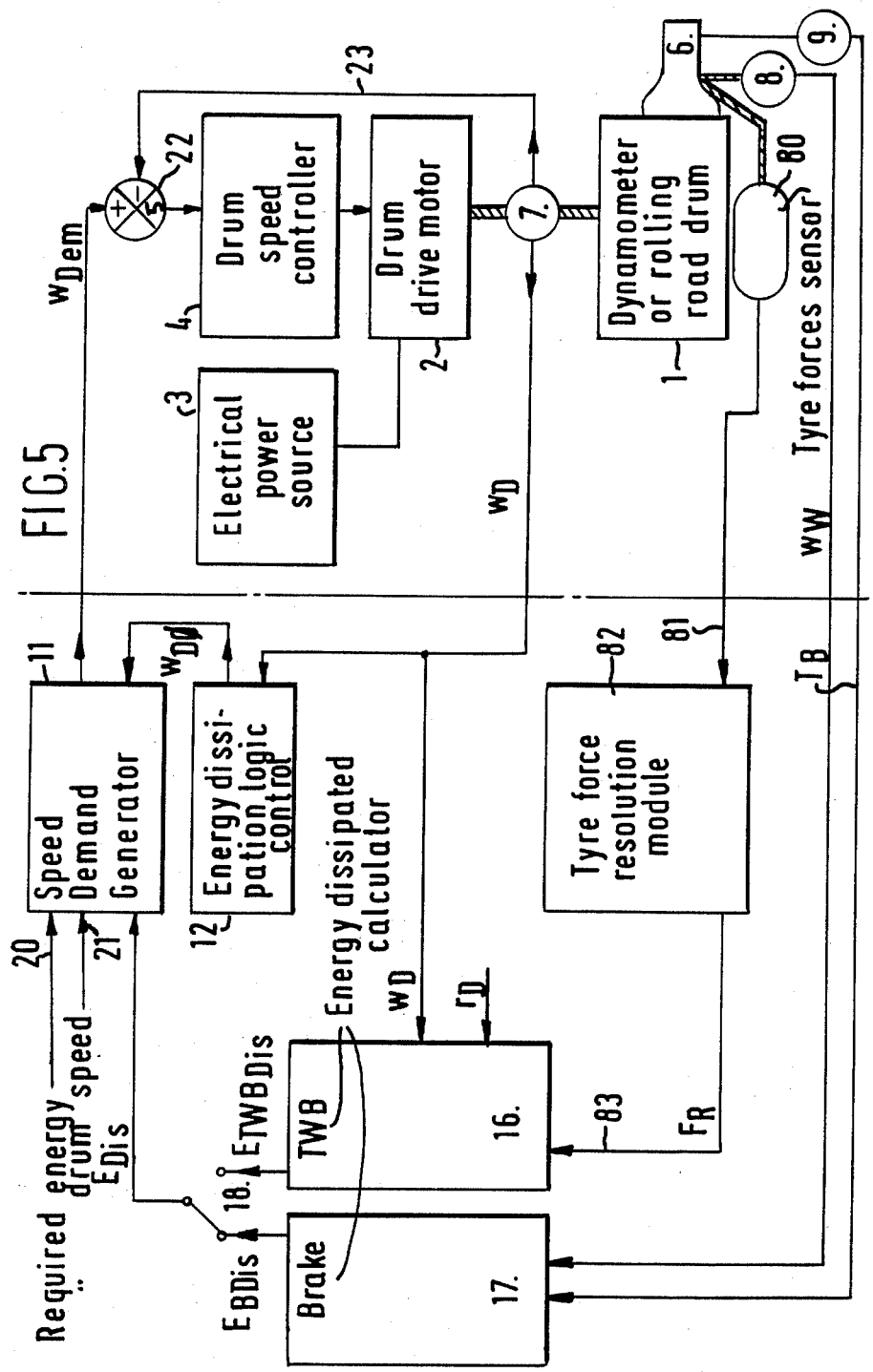
FIG. 5 is a block diagram of a dynamometer and control system for tire, wheel and brake testing according to a yet further embodiment of the invention.

FIG. 5 shows an alternative arrangement for measuring the tyre, wheel and brake energy directly and using that information to calculate $E_{TWB}$. The tire, wheel and brake energy dissipated $E_{TWB}$ may be derived from the drum surface speed and the retarding force on the drum by the equation:

$$E_{TWB} = \int_o^t F_R \cdot r_D \cdot w_D \, dt \quad (20)$$

where $F_R$ represents the total retarding force at the drum/tire interface, $r_D$ represents the radius of the drum, $W_D$ represents the drum speed and the test has proceeded up to time t. By measuring the drum retarding force directly, there is no need to instrument or calibrate the drive system resulting in a lower cost drive and speed controller. Thus a tire forces sensor 80 in the form of a transducer associated with the loading head/wheel mounting mechanisms resolves the forces at the contact point between tire, wheel and brake assembly 6 and the drum 1 and outputs through line 81 a tire force signal to a tire force resolution module 82 that calculates the total retarding force $F_R$ at the interface and outputs a force signal in line 83 to the $E_{TWB}$ calculator 16.

We claim:

1. A dynamometer comprising a member mounted for rotation and driven by driving means, a speed controller to maintain the speed of the member to the required speed in the presence of tractive load variations by controlling the driving means, a test subject mounted for rotation with the member and at the same speed, the test subject including brake means for exerting a brake torque on the member, velocity sensor means for sensing the rotational velocity of the member, power sensor mean for sensing power supplied by the driving means and/or dissipated as brake load, and control apparatus having inputs for an initial rotational velocity and for an amount of energy to be dissipated and operable (a) after the brake has been applied to determine from the sensed rotational velocity and the power supplied or dissipated the energy that has been dissipated since the brake was applied, (b) to derive a proper rotational speed from the initial rotational velocity of the member, the energy already dissipated and the total energy to be dissipated and (c) to output the proper speed for the member to the speed controller.

2. A dynamometer according to claim 1, wherein the member is a drum, the test subject is a wheel mounted for rotation in contact with the surface of the drum and frictionally engaged therewith so that both rotate at the same surface speed, and the brake means exerts a tractive load on the wheel.

3. A dynamometer according to claim 2, wherein the drum is directly coupled to a rotating shaft of said driving means.

4. A dynamometer according to claim 2, wherein the drum is coupled to a rotating shaft of said driving means via a torque shaft.

5. A dynamometer according to claim 2 wherein the drum is coupled to a rotating shaft of said driving means via a gear box and a torque shaft.

6. A dynamometer according to claim 1 wherein the test subject is a brake directly coupled to a rotating shaft of the dynamometer.

7. A dynamometer according to claim 1, wherein the speed controller for said driving means is a Ward Leonard DC generator/synchronous motor set or a thyristor or similar electronic motor control.

8. A dynamometer according to claim 1, wherein the control apparatus is switched by switch means between a first mode where it operates to determine the energy dissipated in a test subject that is a brake alone and a second mode where it operates to determine the energy dissipated in a test subject that is a wheel and brake with a tire attached to the wheel.

9. A dynamometer according to claim 8 wherein, when the control apparatus responds to the rotational velocity of the wheel and the brake torque and is operative to multiply the rotational velocity and torque and to integrate with time to derive the brake energy dissipated.

10. A dynamometer according to claim 8, wherein the control apparatus responds to the rotational speed of the member and the current supplied to the driving means and/or a signal from a torque shaft between the member and the driving means and is operative to determine the change in the kinetic energy of the member, the electrical energy supplied as a time integral of the product of electrical drive torque and speed of the member, and the mechanical losses as a time integral of the product of a mechanical loss torque and speed of the member to derive the energy dissipated in a test subject comprising a wheel, brake and tire.

11. A dynamometer According to claim 8, further comprising transducer means arranged to sense the total retarding force on the member and the control apparatus calculated energy dissipation as a time integral of the product of the retarding force, radius of the member and speed of the member.

12. A dynamometer according to claim 1, wherein the control apparatus outputs a speed demand signal to the speed controller after the brake has been applied that causes the speed of the member to obey the relationship:

$$w_D = w_{D\phi}\sqrt{(1-E_{FDis})}$$

where $w_D$ is the current speed of the member, $w_{D\phi}$ is the speed of the member when the brake was first applied and $E_{F\,Dis}$ is the energy already dissipated as a fraction of the energy to be dissipated.

13. A dynamometer comprising a drum mounted for rotation and driven by drive means, a test body coupled to the drum for rotation therewith in a fixed velocity relationship, means for deriving the energy absorbed or dissipated by the test body, means for determining the rotational velocity of the drum or body, and control means responsive to the energy absorbed or dissipated and to the rotational velocity and operative to supply a control signal to the drive means to maintain the energy absorbed or dissipated as a predetermined function of the drum speed.

* * * * *